(12) United States Patent
Eidelman et al.

(10) Patent No.: US 7,735,311 B2
(45) Date of Patent: Jun. 15, 2010

(54) PULSED DETONATION ENGINES MANUFACTURED FROM MATERIALS HAVING LOW THERMAL STABILITY

(75) Inventors: Shmuel Eidelman, Rockville, MD (US); Dimitrios Lianos, Huntsville, AL (US)

(73) Assignees: Science Applications International Corporation, San Diego, CA (US); U.S. Army Space and Missile Defense Command, Hunsville, AL (US)

( * ) Notice: Subject to any disclaimer, the term of this patent is extended or adjusted under 35 U.S.C. 154(b) by 2019 days.

(21) Appl. No.: 10/730,020

(22) Filed: Dec. 9, 2003

(65) Prior Publication Data

US 2006/0201133 A1 Sep. 14, 2006

(51) Int. Cl.
F02K 5/02 (2006.01)

(52) U.S. Cl. .................. 60/247; 60/909; 239/265.19

(58) Field of Classification Search .................. None
See application file for complete search history.

(56) References Cited

U.S. PATENT DOCUMENTS

| | | | | |
|---|---|---|---|---|
| 4,767,314 | A | * | 8/1988 | Mutchler ................. 431/1 |
| 5,513,489 | A | * | 5/1996 | Bussing ................. 60/39.38 |
| 6,662,550 | B2 | * | 12/2003 | Eidelman et al. ............. 60/247 |
| 2003/0200753 | A1 | * | 10/2003 | Eidelman et al. ............. 60/776 |

OTHER PUBLICATIONS

Eidelman, Shmuel; Sharov, Dmitri; and Book, David; "Aerothermodynamics of Pulsed Detonation Engines" Apr. 6, 2000, Presented at 36th Annual Meeting, Cocoa Beach, FL, 1999, SAIC, pp. 1 to 10.

Eidelman, Shmuel; Sharov, Dmitri; Book, David: Science Applications Inc Mclean VA, Equipment and Supplies: Air Breathing Engines (Unconventional), "Aerothermodynamics of Pulsed Detonation Engines,", http://www.stormingmedia.us/0155/A015504.html.

Eidelman, Shmuel, et al, "Pulsed Detonation Engine Experiental and Theoretical Review," AIAA/SAE/ASME; pp. 857-865; www.fas.org/irp/mystery/pde.htm.

Eidelman, Shmuel; Sharov, Dmitri; Book, David; Apr. 6, 2000; 20020078304 Science Applications, Inc.. McLean, VA USA, Scientific and Technical Aerospace Reports, vol. 40. Nov. 1, 2002, p. 20.

DuPont Engineering Polymers Products—Vespel® http://www.dupont.com/vespel/.

Claims from co-pending application filed Mar. 10, 2004 (Serial No. not assigned), based on U.S. Appl. No. 60/320,001, filed Mar. 11, 2003.

* cited by examiner

Primary Examiner—Timothy D Collins
(74) Attorney, Agent, or Firm—Banner & Witcoff, Ltd.

(57) ABSTRACT

Pulsed detonation engines (PDEs), or various components thereof, such as the detonation chamber and/or nozzle, can be economically constructed from materials having low thermal stability, such as plastics, composites, and light metals. During operation, the intermittent injection and detonation of reactants produces a motive force (e.g., thrust) over relatively short intervals useful in orbit control and the like. The relatively short intervals of operation prevent temperatures of the PDE components from reaching temperatures that would result in their dimensional failure.

24 Claims, 6 Drawing Sheets

PULSED DETONATION ENGINES MANUFACTURED FROM MATERIALS HAVING LOW THERMAL STABILITY

STATEMENT OF FEDERALLY SPONSORED RESEARCH

This invention was made pursuant to U.S. Army Missile Defense Command and Enigmatics Inc. contract number DASG 60-99-C-0045, and the U.S. Government therefore may have certain rights in the invention.

FIELD OF THE INVENTION

The present invention is directed to pulsed detonation engines, and more particularly to pulsed detonation engines having components manufactured from plastics and/or other materials having low thermal stability.

DESCRIPTION OF RELATED ART

In conventional rocket engines, reactive materials are injected into a combustion chamber in which the materials react at high pressure and high temperature in a continuous flow process. After reaction in the combustion chamber, the reaction products expand through a converging/diverging nozzle, reaching high velocities thereby generating thrust. In general, the efficiency of the conventional rocket engine is a function of the temperature in the combustion chamber. Because typical temperatures in the combustion chamber are higher than 1000° C., the structural elements (e.g., combustion chamber, nozzles, etc.) generally are made from materials having very high thermal stability, such as refractory metal alloys and metal/ceramic composites. Such highly thermally stable materials are expensive, leading to high costs for the rocket systems. In addition, the need to raise the temperature in the combustion chamber before engine operation leads to an increase in minimum thrust pulse duration and engine response time. Together these factors negatively affect the controlling capability of the engine, which is especially important in such applications as reaction control systems (RCS) or auxiliary rocket propulsion systems. These systems are used to correct the orbit or maneuver the spacecraft or rocket. The ability to deliver very small thrust impulses is very important for accurate and efficient control of rocket or spacecraft motion.

In a pulsed detonation engine (PDE), the intermittent mode of operation enables thrust to be produced without the need of pre-heating the engine volume. Thrust is produced when reactive materials injected into the detonation chamber are ignited and detonated, producing high pressure/high temperature detonation products in the detonation chamber. Because the detonation phase of the PDE cycle is followed by injection of relatively low-temperature reactive materials, the detonation chamber is cooled by the injection of the fresh reactive materials. However, in a multi-cycle operation, the temperature at any given point on the detonation chamber wall gradually increases for a period of time, typically on the order of 1-3 minutes, until a maximum temperature is reached. Such maximum temperatures exceed the thermal stability limits for most plastics, light metals, fiber-reinforced composites, and other lightweight materials, rendering these materials unsuitable for use in conventional PDEs.

It would be desirable to develop pulsed detonation engines having improved structural efficiency that can be constructed at lower cost from plastics, composites, light metals, and other lightweight materials having low thermal stability, which can be readily manufactured by molding and other methods for manufacturing lightweight engines.

SUMMARY OF THE INVENTION

It has been found that pulsed detonation engines (PDEs), or the various components thereof, such as the detonation chamber and/or the nozzle, can be economically constructed from materials having low thermal stability, especially lightweight materials such as plastics, composites, light metals, or combinations thereof. The use of materials having low thermal stability is possible by operating the PDE at a sufficiently short interval so that the engine components do not reach temperatures that would result in dimensional failure. The PDE of the present invention is particularly useful in such applications as reaction control systems (RCS) thrusters for orbital correction and control (e.g., for earth-orbiting satellites) and for missiles trajectory correction and motion control. Such systems are usually activated for very short and intermittent time intervals and, in some instances, the required motion correction can be facilitated by a small number of single thrust impulses.

According to another aspect of the present invention, a method of generating thrust comprises actuating a PDE for a single thrust impulse or a sequence of impulses for time intervals that do not allow engine components fabricated from low thermal stability materials to reach a temperature that would result in dimensional failure. The PDE comprises a detonation chamber and a nozzle, at least one of which is constructed from a material having low thermal stability. The thrust generated during the interval is particularly useful for such applications as orbital control. A number of PDEs can be assembled into reaction control systems (RCS) that facilitate motion correction in a number of directions, where two or more of the PDEs having component(s) constructed from materials having low thermal stability can be actuated simultaneously or alternatively, for example to induce spacecraft or missile motion in a required direction.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

The pulsed detonation engine (PDE) of the present invention operates by intermittent injection and detonation, thereby producing thrust without requiring that the engine volume be pre-heated prior to operation, as is required for operation of conventional rocket engines. The intermittent injection of the relatively low-temperature reactants cools the engine volume between detonations, leading to only a gradual temperature rise during engine operation. Because only short intervals of operation are needed for many applications, such as the use of reaction control system (RCS) engines for orbit control, the detonation chamber wall does not reach temperatures that lead to dimensional failure of the materials having low thermal stability.

Materials described herein as having "low thermal stability" refer to materials exhibiting good dimensional stability at low-to-moderate temperatures, but which exhibit melting, softening, decomposition, or other loss of dimensional stability at temperatures of about 600 K. Such materials are particularly inclusive of a wide variety of plastics, composites (including fiber-reinforced composites), light metals, and combinations thereof. Non-limiting examples of suitable plastics include polytetrafluoroethylene (Teflon®), Vespel (available from Dupont), polyimide, and bismaleimide. Non-limiting examples of suitable composites include carbon-carbon composites and glass fiber-reinforced composites, including those containing conventional glass-ceramic matrices such as litha-aluminum-silicate, silica, and $BaO—SiO_2—Al_2O_3—Si_3N_4$ with SiC. Non-limiting examples of suitable light metals include aluminum and its alloys, magnesium and its alloys, and aluminum-titanium alloys.

Figure 1:
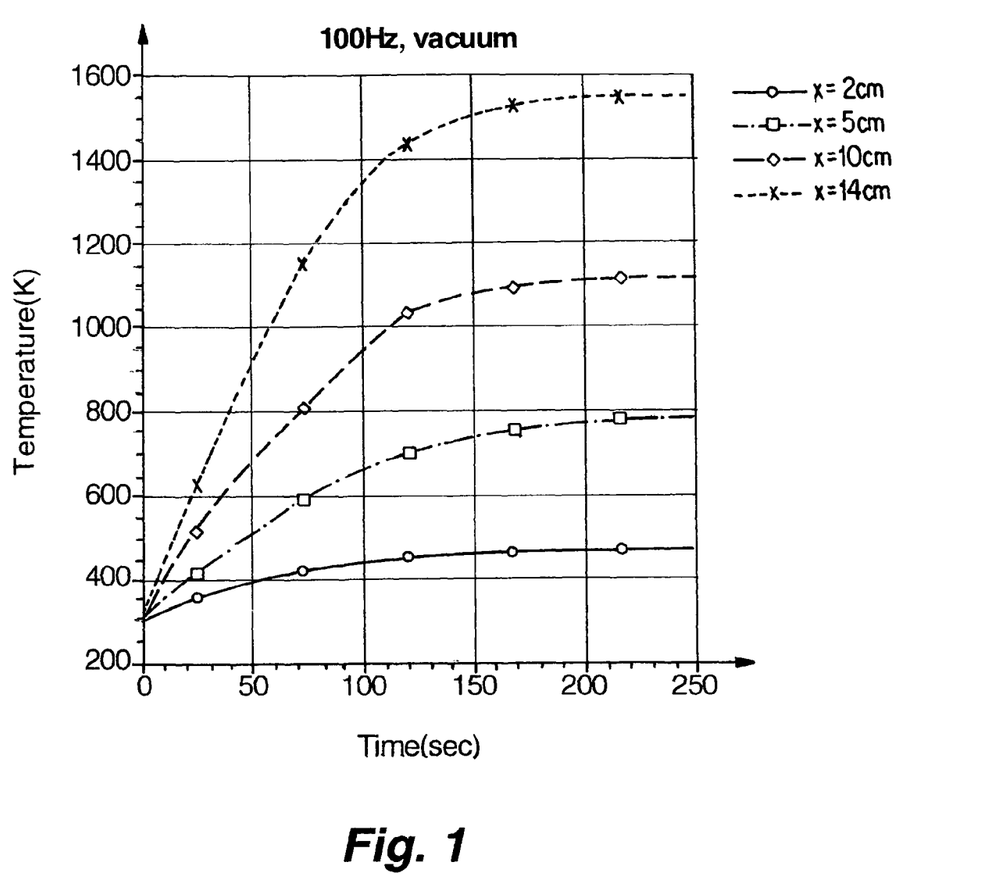
FIG. 1 is a graph illustrating temperatures at various locations along a pulsed detonation engine wall as a function of time from the start of engine operation.

FIG. 1 graphically illustrates temperatures at various locations on a detonation chamber wall in a conventional PDE as a function of the time from the start of engine operation. The PDE was operated at 100 Hz in a vacuum. As can been seen from FIG. 1, the maximum temperatures at the various locations (2 cm, 5 cm, 10 cm, and 14 cm from the inlet end of the detonation chamber) were reached in approximately 150 seconds. At 20 seconds from the start of operation, however, the temperature at each of the locations was less than 600 K, which is within the limits of thermal stability for many plastics, fiber-reinforced composites, and light metals.

The maximum interval of operation (i.e., the maximum amount of time that the intermittent injection and detonation process occurs at a given frequency without interruption) for the PDE of the present invention is a function of the rate of temperature increase of the detonation chamber and/or the other structural components of the PDE constructed from the material(s) having low thermal stability. The maximum interval of operation also is a function of the physical properties of the material(s), in particular the maximum temperature that the material(s) can reach before undergoing dimensional failure. There is no particular minimum interval of operation contemplated; a very short interval of operation at a high frequency, for example, may be useful to generate a sufficient amount of thrust needed for some applications. The operation of PDEs in RCS is a function of orbit or trajectory correction that is required by the control system. For some orbit correction maneuvers, the PDEs may be required to generate single impulses of thrust every hour or once per day, for example, where other applications may require the PDE to operate at a given frequency without interruption for 60 seconds, for example, to facilitate a rapid change in trajectory.

Figure 4A:
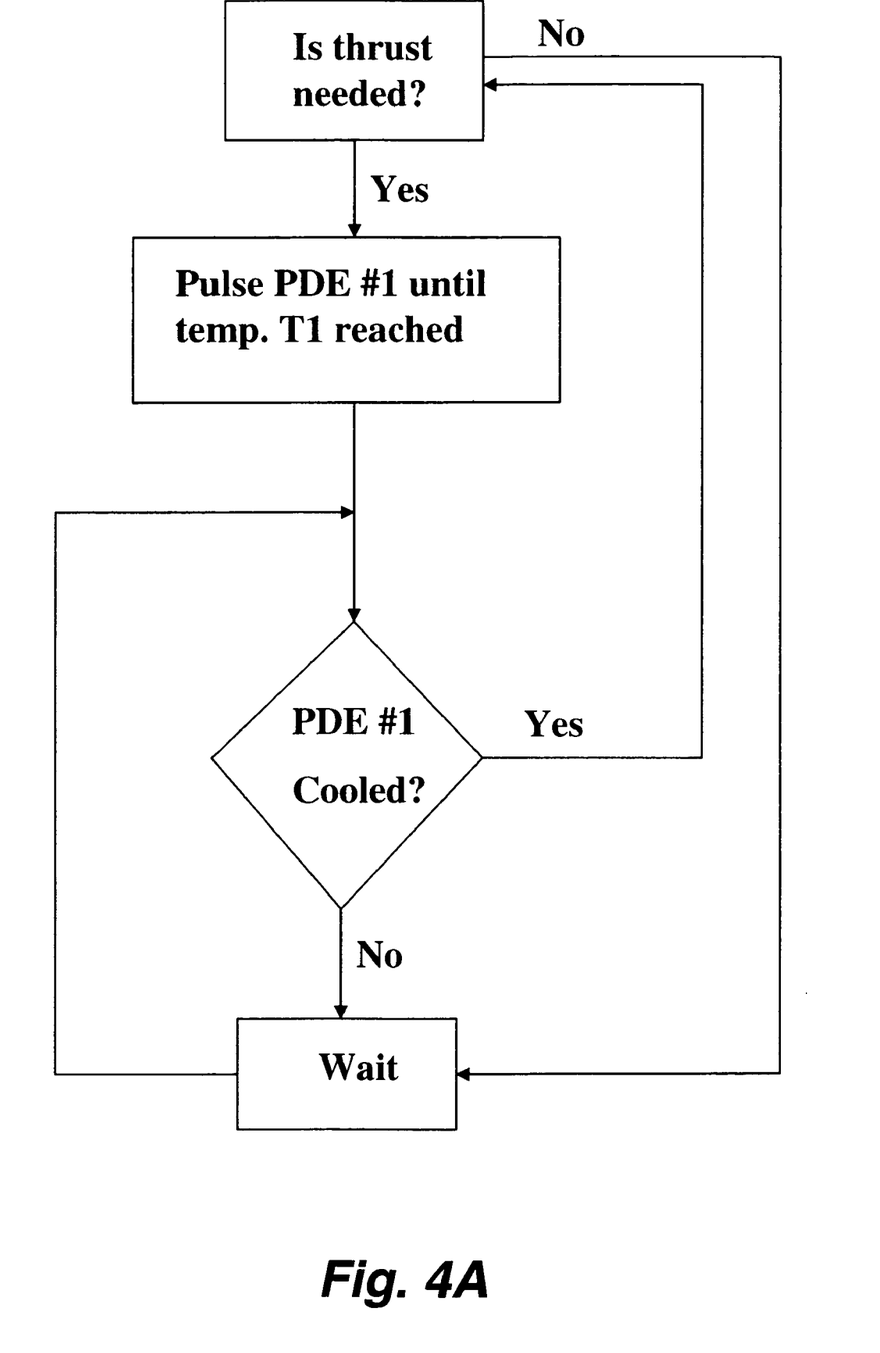
FIGS. 4A and 4B are flowcharts illustrating methods of generating thrust in accordance with the present invention.

The maximum interval of operation can be controlled or determined in a number of different ways. In one embodiment, one or more temperature sensors (TS) can be provided on the detonation chamber wall to sense the wall temperature during engine operation. When the temperature reaches a predetermined level (i.e., a temperature somewhat lower than a temperature that will result in dimensional failure), a control unit can instruct the PDE to pause for a period of time to permit cooling. When the wall temperature reaches a suitable cooled temperature, the PDE can be re-actuated for another interval of operation in an analogous manner, and the cycle can be repeated as needed. Of course, if at any time thrust is no longer needed, the control unit can stop operation of the PDE. FIG. 4A is a flow chart illustrating this type of operation for a single PDE.

In another technique, the maximum interval of operation can be determined empirically using principles of heat transfer and the material's physical properties. The maximum interval of operation corresponds to the amount of time it will take during engine operation for a point on the detonation chamber to reach a predetermined maximum temperature. This technique avoids the need for actually measuring wall temperature during PDE operation.

Yet another example of a technique that can be used for determining the maximum interval of operation involves first measuring the detonation chamber wall temperature experimentally, and then selecting fixed parameters based on the results. As in the previous embodiment, the maximum interval of operation corresponds to the amount of time it will take during engine operation for a point on the detonation chamber to reach a predetermined maximum temperature.

Regardless of the technique used for determining the maximum interval of operation, it is preferred that at least one temperature sensor be provided for the detonation chamber and/or nozzle, in communication with a control unit for automatically shutting down the engine in the event the temperature approaches or exceeds the thermal stability limits of the PDE. Whenever the detonation chamber wall temperature is not actually measured during operation, it is preferable to select an interval of operation to account for unexpected temperature increases that may occur during operation. This translates to selecting a time value that is somewhat shorter than the theoretical maximum value.

The operational frequency of the PDE can vary over a wide range and most often ranges from about 1 to about 500 Hz, more usually from about 50 to about 200 Hz. Because higher frequencies translate to shorter cooling periods between detonations, higher frequencies tend to yield faster rates of temperature increase. As a result, the maximum interval for which the PDE can be operated generally is longer for lower frequencies and generally is shorter for higher frequencies.

Figure 2:
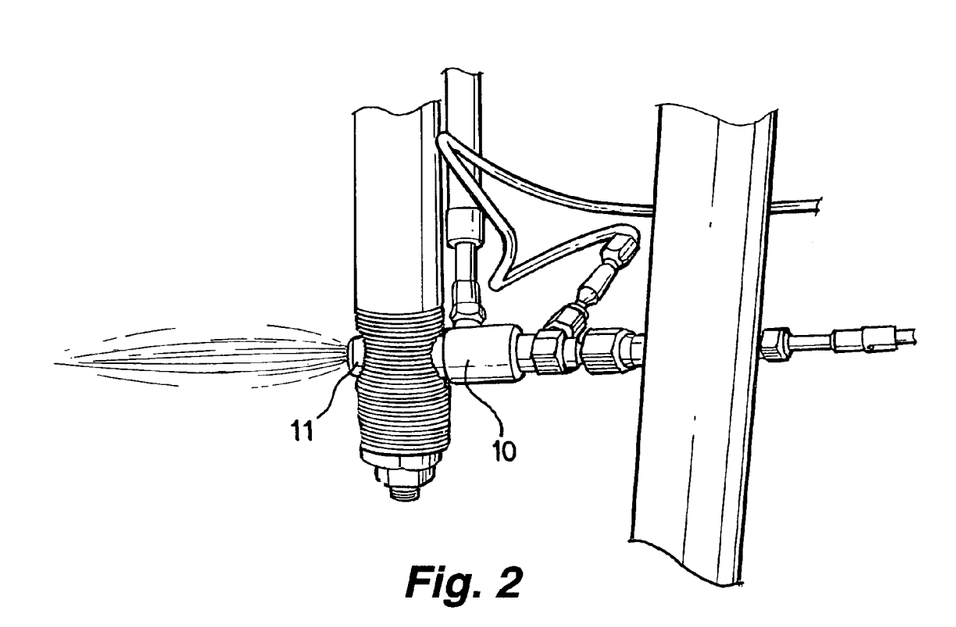
FIG. 2 is a depiction of a pulsed detonation engine manufactured from Vespel in accordance with one embodiment of the present invention.

FIG. 2 illustrates a plastic PDE in operation in accordance with one embodiment of the present invention. The illustrated PDE has a detonation chamber 10 and a nozzle 11, both constructed from Vespel plastic. The device has an overall length of 3 cm and a width of 0.5 cm. PDEs constructed from Vespel and polytetrafluoroethylene were successfully tested for 10 to 30 second intervals of operation at frequencies ranging from 50 to 200 Hz.

Figure 3:
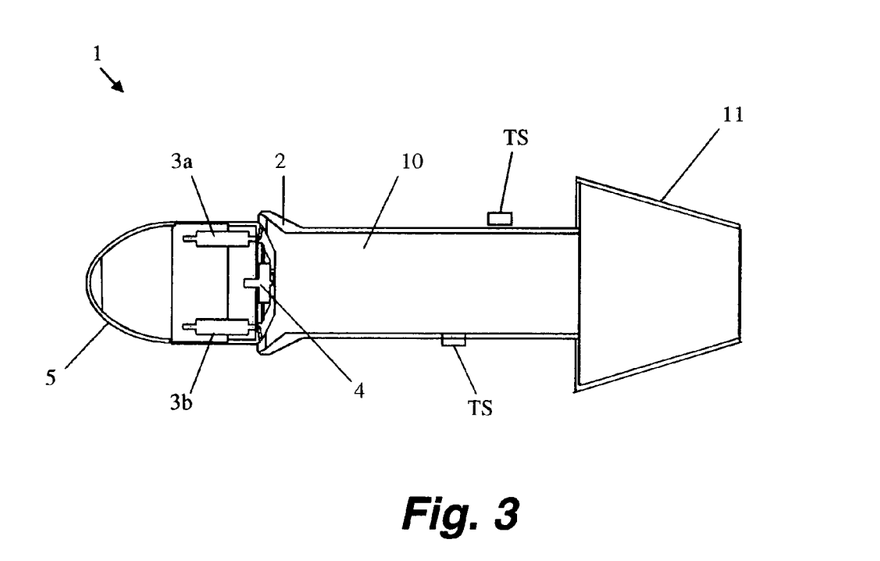
FIG. 3 is a schematic illustration of a pulsed detonation engine in accordance with one embodiment of the present invention.

FIG. 3 schematically illustrates the components of the pulsed detonation engine 1 in accordance with one embodiment of the present invention. The engine 1 includes an engine forebody 5, a detonation chamber 10, and a nozzle 11. A set of electronically controlled fuel valves 3a, 3b within the forebody 5 are provided for controlling flow of propellant injected into the detonation chamber 10. The injected propellant forms a detonable mixture that fills the detonation chamber 10. A suitable igniter 4, such as a spark plug, laser, pyrotechnic device, etc., is provided in the detonation chamber 10 to ignite the detonable propellant mixture, producing detonation products. The detonation reaction produces a brief period of extremely high temperature and high pressure inside the detonation chamber 10. Typical detonation temperatures are on the order of 4000 K and pressures on the order of 20-40 atmospheres. Temperature sensors TS optionally are provided at one or more locations to measure the temperature of the detonation chamber 10 and/or the temperature of the nozzle 11. The temperature sensors TS may be used to control the interval of operation (as discussed previously) and/or to automatically shut down the engine if the temperature of the detonation chamber 10 or nozzle 11 approaches the thermal stability limits of the material.

The dimensions of the PDE as well as its individual components may vary over a wide range depending on the requirements of a particular application, and the present invention should not be construed as being limited to any particular dimensions or geometrical configurations. By way of example, the length of the detonation chamber 10 may range from about 1 to 100 cm, and its diameter may range from about 0.1 cm to 50 cm. A nozzle 11 is attached at the aft of the detonation chamber 10. The nozzle 11 may be a converging-diverging nozzle, as illustrated in FIG. 3, or may have any other suitable geometric configuration, such as cylindrical, converging (e.g., conical), and the like. The overall length of the device 1 may range, by way of example, from about 1 to 150 cm. These dimensions should be regarded as exemplary and not limiting. It is contemplated that devices having significantly smaller or significantly larger dimensions can be made and used in accordance with the principles of the present invention.

A wide variety of fuels can be used with the PDE of the present invention, including fuels conventionally used in pulsed detonation engines. Non-limiting examples include fuels detonable in mixtures with air or oxygen such as hydrogen, methane, propane, acetylene, or propylene. Also, detonable mixtures of liquid fuels and air can be used, e.g., kerosene/air, alcohol/air, benzene/air and other similar mixtures. Detonable monopropellants also can be used, such as nitromethane, nitroglycerin, or similar single-component fuels. Other useful fuels include aluminum (solid or vapor), magnesium (solid or vapor), carbon, and boron.

A fuel-rich gas based on aluminum can be generated without the undesirable formation of an oxide layer. The aluminum particle size should be kept below 10 microns to maintain a sustained detonation. Aluminum also can be generated as a vapor, which will further enhance its detonability. Magnesium can be generated as a solid or vapor suspension, and can be detonated. The magnesium particles or droplets should be approximately 10 microns or less to detonate. Both aluminum and magnesium vapor suspensions have very favorable detonation properties. However, an undesirable property of the vapor suspensions is their tendency to condense on cold surfaces because of the relatively high melting points of the two metals. Condensation of aluminum and magnesium vapor can cause mechanical problems if it occurs on tightly fitting parts with small gap tolerances. Alternatively, the system can be heated by designing a gas generator fuel grain that first produces hot gas followed by the fuel-rich gases.

For space applications of plastic PDE-based reaction control systems (RCS), detonable monopropellant such as nitromethane, nitroglycerin, hydrazine, and bipropellant such as $H_2O_2$/nitromethane or $H_2O_2$/kerosene can be used.

To ensure the optimum condition for fuel-air detonation, the fuel and air should be thoroughly mixed to ensure the fuel concentration is within the detonability limit (i.e., near stoichiometric). Mixing can be characterized on several levels including macroscopic and microscopic scales. Macroscopic mixing refers to the bulk fluid processes, which bring the fuel and air components to close proximity (e.g., impingement of fuel and air streams). Microscopic mixing is the process by which the fuel and air are further mixed to a length scale required for detonation. Many techniques can be employed to produce microscopic mixing.

Several methods for initiating a detonation cycle may be used. Detonation may be initiated by igniting a fuel-oxygen mixture in a small detonation tube (not illustrated) that discharges into the detonation chamber, or by igniting a fuel-oxygen mixture collocated within the detonation chamber. Alternatively, a high voltage electric discharge or pyrotechnic igniter can be used. The small detonation tube method generally requires fuel, an oxidizer, pumps, high-speed fluid valves, an electronic controller, a power supply and a spark generator. The direct electric discharge method generally requires a spark plug, an electronic controller and a power supply. Laser ignition can be used, where a laser produces a high-energy beam initiating detonation of propellant in the detonation chamber.

Figure 6:
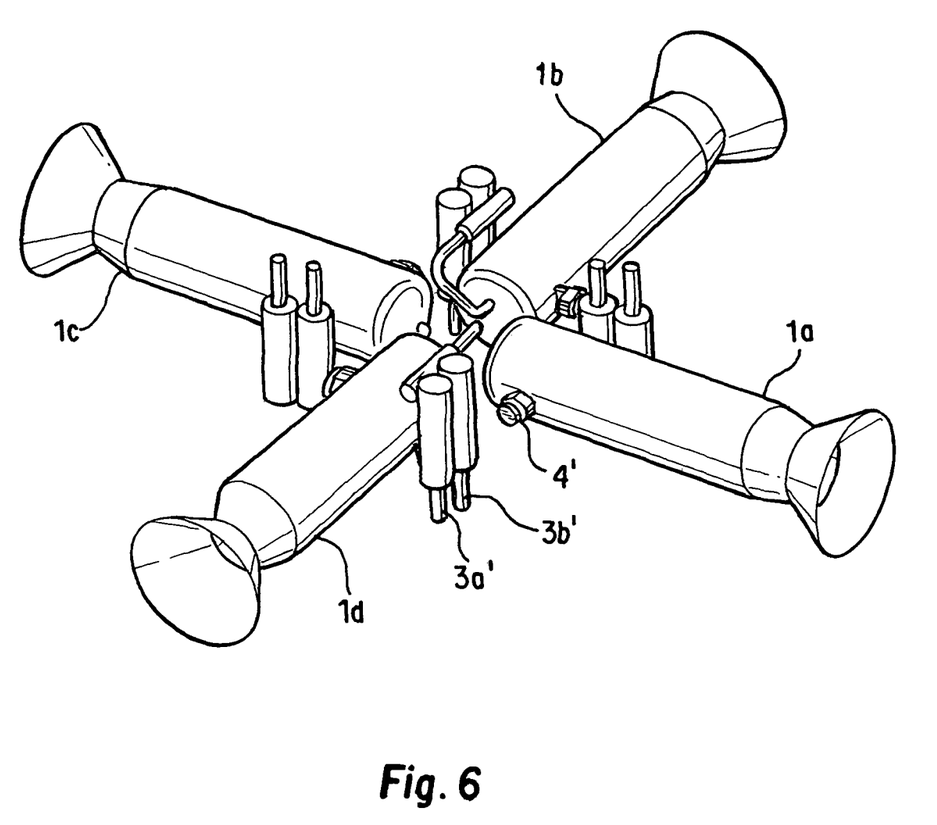
FIG. 6 is a schematic illustration of four PDEs assembled into cruciform forming a reaction control system (RCS) for generating thrust to induce spacecraft or missile motion in a required direction for spacecraft or missile motion control.

The PDE of the present invention can be used alone or in combination with one or more additional PDEs for generating thrust. In FIG. 6, for example, a cruciform RCS having four PDEs is shown. The thrust generated during the interval of operation, as previously described, is particularly useful in such applications as orbital control for earth-orbiting satellites. The PDE may be mounted onto a satellite such that its operation produces thrust in a particular direction or vector. Optionally, the PDE is mounted onto a robotic device, which enables the PDE to be rotated along one or more axes to vary the direction of thrust. Two or more PDEs can be actuated simultaneously or sequentially.

Simultaneous actuation of multiple PDEs can be used, for example, to increase the total amount of thrust generated during an interval of operation or to generate thrust vector in a particular direction. Sequential actuation of two or more PDEs may be desirable in cases where a longer period of thrust is needed. For example, a first PDE can be actuated for a first interval and then cooled for a period during which operation of a second PDE for a second interval continues thrust generation. If even longer periods of thrust are needed, the first and second (and possibly additional) PDEs can be operated cyclically for extended periods of thrust generation.

Figure 4B:
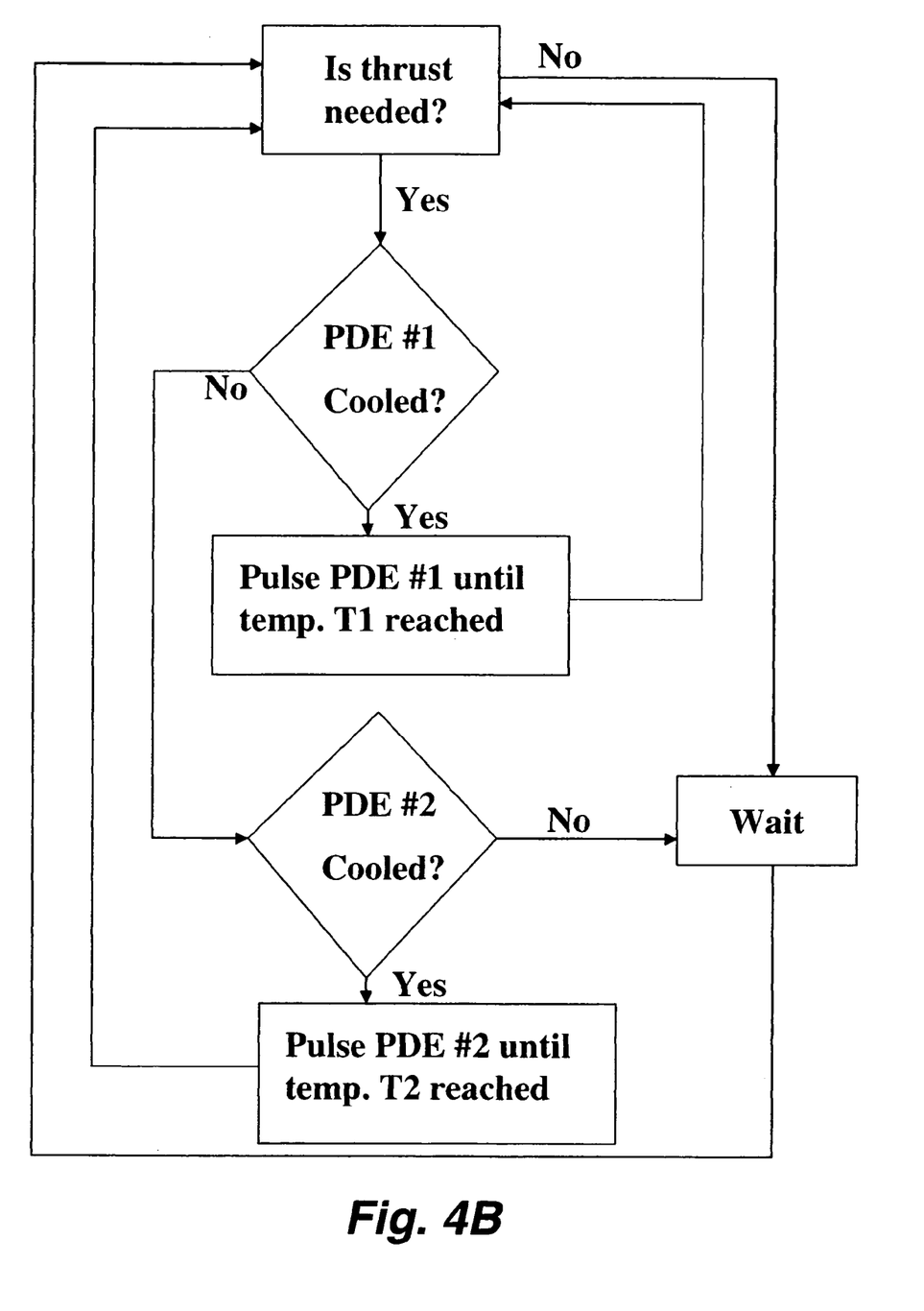
Figure 5:
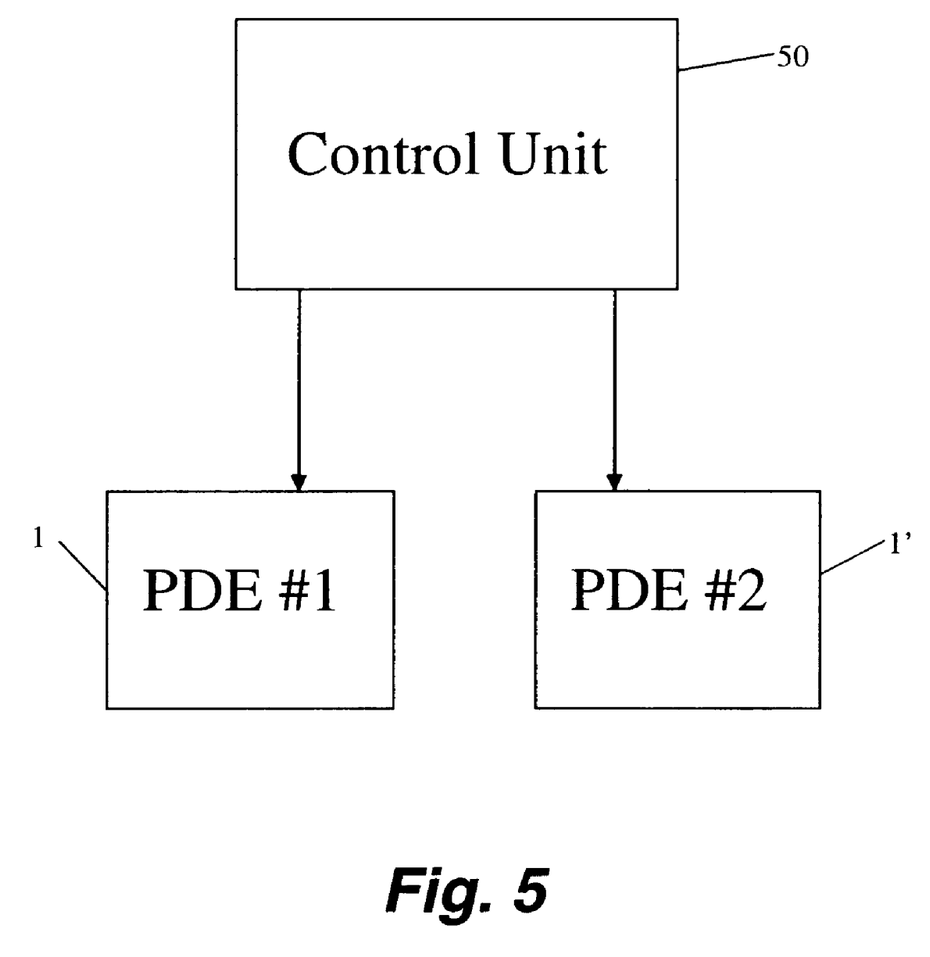
FIG. 5 is a schematic illustration of a multiple engine configuration with a control unit in accordance with an alternative embodiment of the present invention.

FIG. 4B is a flowchart showing an example of alternative operation of two PDEs for generating thrust in a common direction. FIG. 5 schematically illustrates two PDEs 1, 1' in communication with a control unit 50. When thrust is needed, the first PDE (PDE #1) is actuated for a first interval of operation until a maximum temperature T1 is reached at a point in the first engine. If additional thrust is needed and PDE #1 has yet not cooled to a suitable temperature to restart operation, the second PDE (PDE #2) is actuated for a second interval of operation until a maximum temperature T2 is reached in the second engine. If yet more thrust is needed, the control unit 50 will determine whether PDE #1 has cooled to a suitable temperature to restart operation. If PDE #1 has adequately cooled, the control unit 50 will actuate PDE #1 for another interval of operation. If PDE #1 has not adequately cooled, the control unit 50 will determine if PDE #2 has adequately cooled. If PDE #2 has adequately cooled, the control unit 50 will actuate PDE #2 for another interval of operation. If neither engine has adequately cooled, the control unit 50 will wait until one of the engines has cooled to a suitable temperature to restart operation.

The multiple engine operation can also employ the techniques for determining the maximum intervals of operation as previously described. The time periods needed for cooling the PDEs also can be determined empirically or experimentally. Thus, it is possible to prepare a schedule of operation that takes into account both the maximum intervals of operation and the cooling periods needed for each PDE. For example, a schedule of operation may include actuating a first PDE for a first interval, followed by actuating a second PDE for a second interval, followed by a predetermined waiting period. This schedule can be repeated as necessary until the requisite amount of thrust is generated.

FIG. 6 illustrates four PDEs 1a, 1b, 1c, and 1d assembled into a cruciform, forming a reaction control system (RCS) for generating thrust, e.g., to induce spacecraft or missile motion in a required direction for spacecraft or missile motion control. Each of the PDEs 1a, 1b, 1c, and 1d includes electronically controlled fuel valves 3a' and 3b', an igniter 4', and other features as previously described.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A detonation chamber adapted for use with a pulsed detonation engine, wherein said detonation chamber is constructed predominately from a material having low thermal stability.

2. The detonation chamber of claim 1, wherein said material having low thermal stability is selected from the group consisting of plastic, composite material, light metal, and combinations thereof.

3. The detonation chamber of claim 2, wherein said material having low thermal stability comprises plastic selected from the group consisting of Vespel, polytetrafluoroethylene, polyimide, and bismaleimide.

4. The detonation chamber of claim 2, wherein said material having low thermal stability comprises composite materials selected from the group consisting of carbon-carbon composites and glass fiber-reinforced composites containing glass-ceramic matrices selected from the group consisting of litha-aluminum-silicate, silica, and $BaO$—$SiO_2$—$Al_2O_3$—$Si_3N_4$ with SiC.

5. The detonation chamber of claim 2, wherein said material having low thermal stability comprises one or more light metals selected from the group consisting of aluminum and its alloys, magnesium and its alloys, and aluminum-titanium alloys.

6. A nozzle adapted for attachment to a pulsed detonation engine, wherein said nozzle is constructed from a material having low thermal stability.

7. The nozzle of claim 6, wherein said material having low thermal stability is selected from the group consisting of plastic, composite material, light metal, and combinations thereof.

8. The nozzle of claim 7, wherein said material having low thermal stability comprises plastic selected from the group consisting of Vespel, polytetrafluoroethylene, polyimide, and bismaleimide.

9. The nozzle of claim 7, wherein said material having low thermal stability comprises composite materials selected from the group consisting of carbon-carbon composites and glass fiber-reinforced composites containing glass-ceramic matrices selected from the group consisting of litha-aluminum-silicate, silica, and $BaO$—$SiO_2$—$Al_2O_3$—$Si_3N_4$ with SiC.

10. The nozzle of claim 7, wherein said material having low thermal stability comprises one or more light metals selected from the group consisting of aluminum and its alloys, magnesium and its alloys, and aluminum-titanium alloys.

11. A pulsed detonation engine comprising a detonation chamber and a nozzle, wherein at least one of said detonation chamber and said nozzle is constructed predominately from a material having low thermal stability.

12. The pulsed detonation engine of claim 11, wherein said material having low thermal stability is selected from the group consisting of plastic, composite material, light metal, and combinations thereof.

13. The pulsed detonation engine of claim 11, wherein said material having low thermal stability comprises plastic selected from the group consisting of Vespel, polytetrafluoroethylene, polyimide, and bismaleimide.

14. The pulsed detonation engine of claim 11, wherein said material having low thermal stability comprises composite materials selected from the group consisting of carbon-carbon composites and glass fiber-reinforced composites containing glass-ceramic matrices selected from the group consisting of litha-aluminum-silicate, silica, and $BaO$—$SiO_2$—$Al_2O_3$—$Si_3N_4$ with SiC.

15. The pulsed detonation engine of claim 11, wherein said material having low thermal stability comprises one or more light metals selected from the group consisting of aluminum and its alloys, magnesium and its alloys, and aluminum-titanium alloys.

16. A thrust mechanism comprising at least two pulsed detonation engines and a control unit for alternatively actuating said at least two pulsed detonation engines, wherein each pulsed detonation engine is constructed predominately from a material having low thermal stability.

17. A method of generating thrust comprising actuating a first pulsed detonation engine for a first interval of operation, wherein said first pulsed detonation engine is constructed predominately from a first material having low thermal stability.

18. The method of claim 17, wherein said first material having low thermal stability is selected from the group consisting of plastic, composite material, light metal, and combinations thereof.

19. The method of claim 17, further comprising actuating a second pulsed detonation engine for a second interval of operation, wherein said second pulsed detonation engine is constructed from a second material having low thermal stability.

20. The method of claim 19, wherein said second material having low thermal stability is selected from the group consisting of plastic, composite material, light metal, and combinations thereof.

21. The method of claim 19, wherein said second interval of operation begins at about the end of said first interval of operation.

22. The method of claim 19, wherein said second interval of operation substantially coincides with said first interval of operation.

23. The method of claim 21, further comprising re-actuating said first pulsed detonation engine after the conclusion of said second interval of operation, optionally after cooling said first pulsed detonation engine.

24. The method of claim 17, wherein said first pulsed detonation engine is a reaction control system (RCS) thruster for orbital control.

* * * * *